Dec. 22, 1936.  J. F. WERDER  2,065,484
AUTOMATIC TRANSMISSION
Filed May 10, 1933  3 Sheets-Sheet 1

INVENTOR.
JOHN F. WERDER
BY Milburn and Milburn
ATTORNEYS.

Dec. 22, 1936.     J. F. WERDER     2,065,484
AUTOMATIC TRANSMISSION
Filed May 10, 1933     3 Sheets-Sheet 2

INVENTOR.
JOHN F. WERDER
BY
ATTORNEYS.

Dec. 22, 1936.   J. F. WERDER   2,065,484
AUTOMATIC TRANSMISSION
Filed May 10, 1933   3 Sheets-Sheet 3

INVENTOR
JOHN F. WERDER.
BY *Milburn and Milburn*
ATTORNEYS.

Patented Dec. 22, 1936

2,065,484

UNITED STATES PATENT OFFICE 2,065,484

AUTOMATIC TRANSMISSION

John F. Werder, Lakewood, Ohio

Application May 10, 1933, Serial No. 670,382

23 Claims. (Cl. 192—.01)

This invention relates to a power transmission mechanism for use in connection with an internal combustion engine.

The object of the present invention is to devise an automatic transmission mechanism by means of which the rate of speed of the driven shaft can be gradually accelerated from zero to any point desired but without the usual necessity of shifting gears.

A further object consists in devising such an automatic transmission mechanism by which the power is first transmitted through an intermediate mechanism for gradually accelerating the rate of speed of the driven shaft from zero to a point corresponding substantially with that of the drive shaft and then automatically establishing a direct drive connection between the drive and driven shafts, at the same time discontinuing operation of the intermediate mechanism.

Another object is to provide such an automatic transmission mechanism in which the operation of the gradually accelerating transmission mechanism is under control of the accelerator of the engine during those periods of operation when the rate of speed of the driven shaft is below a certain predetermined point.

More specifically, the object is to devise such a device which includes a gradual and progressive power transmission mechanism and which operates in such a manner that the actuation of this mechanism will be automatically controlled in accordance with the speed of the driven shaft so that for all direct-drive speeds below a certain predetermined point, the gradually accelerating mechanism may be rendered effective for the purpose of again gradually building up the speed of the driven shaft.

Also, it is an object to devise such a mechanism, as just referred to, in which any variation in the speed of the driven shaft will not disturb the direct-drive connection so long as the rate of speed of the driven shaft is maintained above a predetermined point.

Another object consists in devising such an automatic transmission mechanism in which there is provided also a means for automatically restoring the gradually accelerating transmission mechanism to its original condition so as always to be ready for operation.

It is also an object of the present invention to devise an automatic transmission mechanism in which the various parts are so constructed and arranged that they will co-operate in an efficient and dependable manner and will afford the various advantages as hereinafter set forth.

Other objects will appear from the following description and claims when considered together with the accompanying drawings.

It is to be understood that the present automatic transmission mechanism is embodied in an automobile mechanism in which the usual transmission, clutch, and accelerator together with their conventional forms of control levers are retained. These several conventional parts of the familiar form of automobile engine are indicated only in a general way for purposes of present illustration.

The engine and clutch mechanism are indicated by reference numeral 1, the clutch pedal being indicated by reference numeral 2. The carburetor is indicated by reference numeral 3, the intake manifold is indicated by reference numeral 4, the butterfly valve in the intake manifold is indicated by reference numeral 5, and the accelerator pedal is indicated by reference numeral 6.

The drive shaft from the engine is indicated by reference numeral 7 and the driven shaft is indicated by reference numeral 8, these two shafts being in longitudinal alignment with each other. The end of shaft 7 is bored out so as to receive the correspondingly reduced end portion of the shaft 8, thereby providing a bearing which is adapted to maintain these parts in proper alignment. The usual form of transmission is indicated by reference numeral 9 with the lever arm 10 for manipulation thereof.

In the present invention, there is provided a mechanism for gradually accelerating the transmission of power from the drive shaft 7 to the driven shaft 8 so that with the conventional transmission set in any gear ratio, the rate of speed of the driven shaft 8 may be built up from zero to approximately that of the drive shaft preparatory to establishing direct drive connection between the drive shaft 7 and the driven shaft 8. This mechanism will now be described.

The sprocket 11 is freely mounted upon the shaft 7 and has drive connection through the sprocket chain 12 with the sprocket 13 which is fixed upon the shaft 14 of the conical shaped drum 15. This drum is spirally grooved so as to accommodate the cable 16 which is adapted to be wound thereabout and which has its one end fixed at the point 17 to the small end of the drum 15.

The other end of the cable 16 is fixed at the point 18 to the smaller end of the conical drum 19 which is also suitably grooved so as to accommodate the cable 16 which is adapted to be spirally wound thereabout. It will be observed that the drums 15 and 19 are arranged in reverse manner with respect to the taper thereof. The drum 19 and the drum 15 are both suitably mounted within the frame structure of the mechanism while the drum 19 is adapted to drive the sprocket 20 which is fixedly mounted upon the shaft 21 of the drum 19. The sprocket 20 is adapted to drive the sprocket wheel 22 through the sprocket chain connection 23, the sprocket 22 being freely mounted upon the driven shaft 8. The one face of the sprocket 22 is formed as a ratchet 24 which has operative engagement with the pawl 25 carried by the clutch member 26 which is fixedly mounted upon the driven shaft 8. Thus, there is provided a one-way drive connection between the sprocket 22 and the driven shaft 8, in other words, between the drum 19 and the driven shaft 8.

By having the ends of the cable fastened to the drums, this mechanism is positive in its action and there is no danger of slippage.

In the accompanying illustration, it will be observed that the small end of drum 15 is approximately one-fourth the size of the large end of drum 19, this ratio corresponding approximately to that of conventional low gear. Thus, with the transmission 9 set in high gear, there can be obtained the advantage of low gear during the initial starting period, and the speed can be increased gradually from this point up to any point desired but without requiring any shifting of the conventional gears.

The number of turns required on drum 15 will vary with the type of vehicle upon which the mechanism is employed, one hundred (100) turns being sufficient for a small automobile while three hundred (300) or more turns may be required on heavy duty vehicles, as for instance large trucks or busses.

Figure 5:
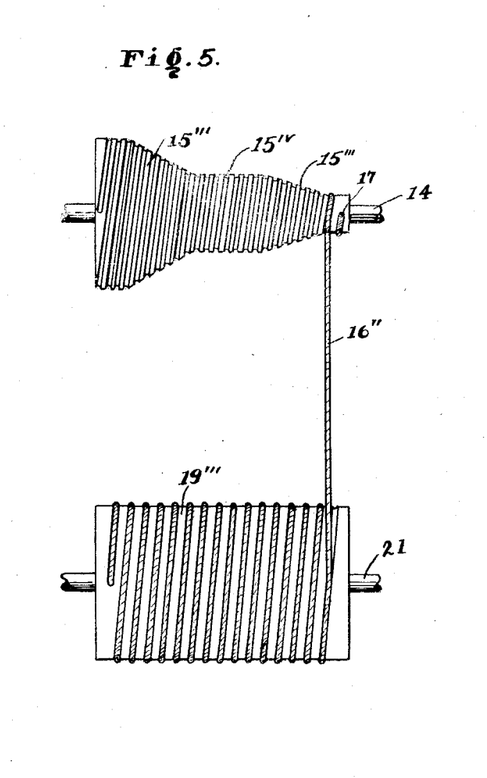
Figs. 5 and 6 illustrate modified combinations of drums adapted for use instead of the combination shown in Fig. 1.
Figure 6:
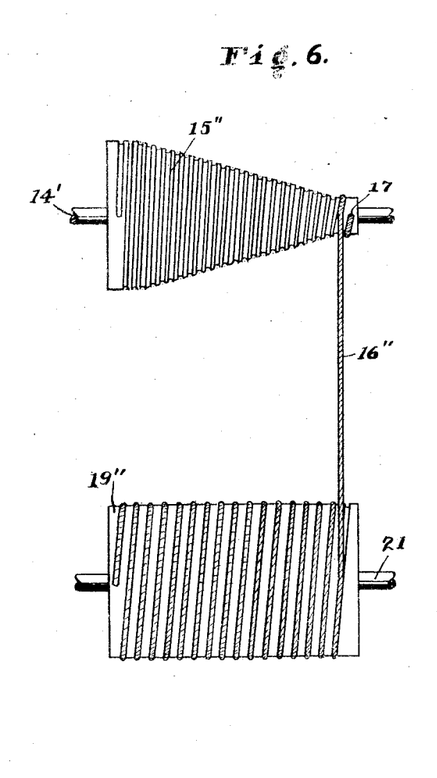

The drums 15 and 19 may be formed of various shapes. For instance as illustrated in Fig. 6 of the drawings, drum 19'' might be made cylindrical and drum 15'' of a more conical form without any difference in the result obtained. Or as illustrated in Fig. 5, drum 15''' might be made with a cylindrical middle portion 15$^{iv}$ in order to allow time for the motor to accelerate at an intermediate rate of speed before permitting the rate of speed to be further advanced, the drum 19''' being cylindrical. In both of these modifications (Figs. 5 and 6), the larger end of the tapered drum is of substantially the same or slightly less diameter than the companion cylindrical drum, the same thing being true of the form indicated in Fig. 1.

Figures 1, 2:
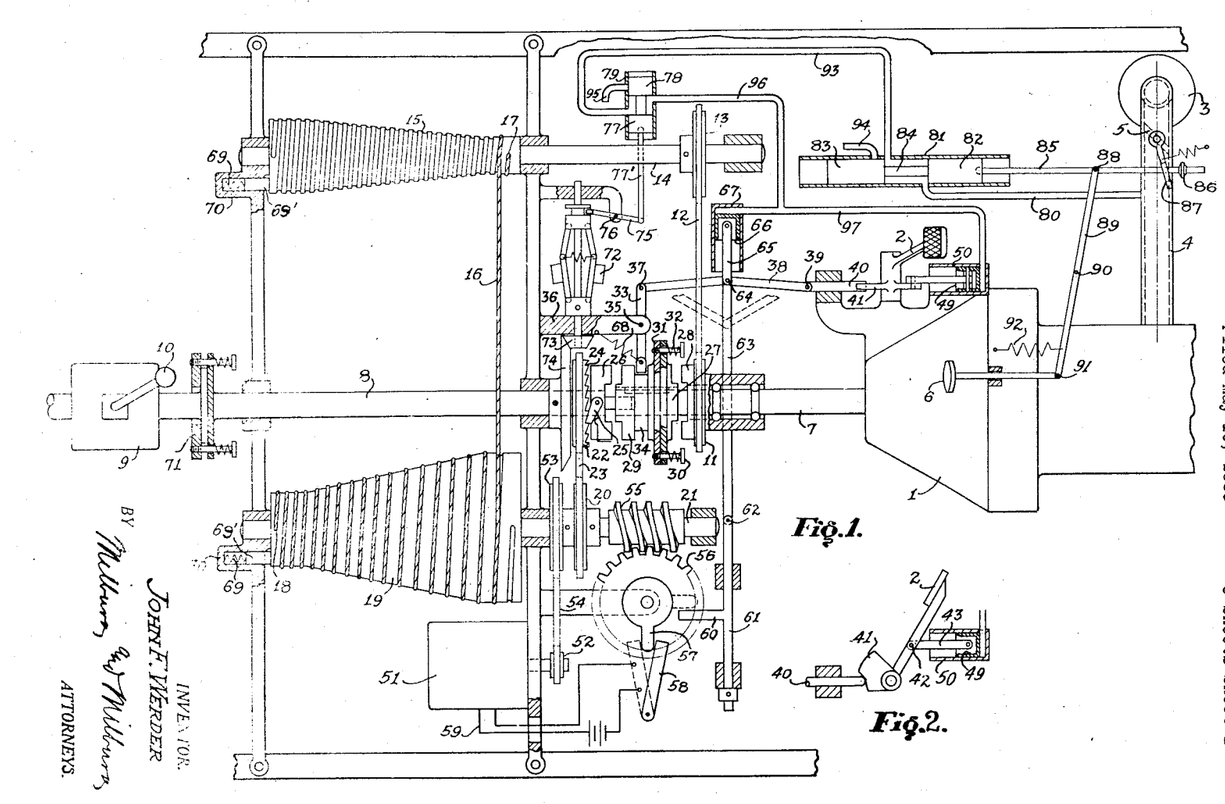
Fig. 1 is a plan view of an assembly of automobile mechanism embodying my present invention.
Fig. 2 is a side elevation of the clutch pedal and other parts operatively connected therewith.
Figure 3:
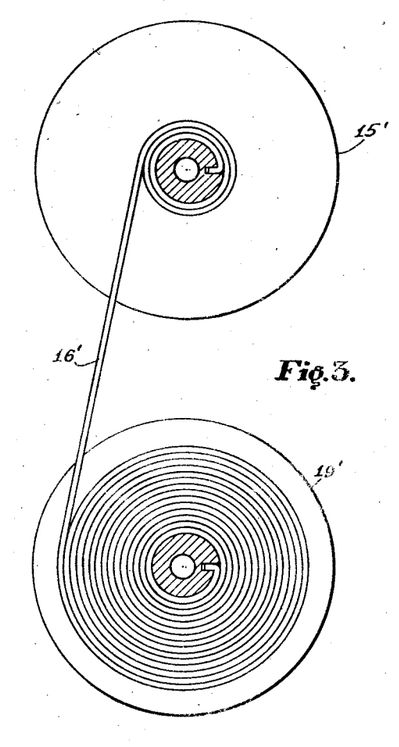
Figs. 3 and 4 are views, taken at right angles to each other, of a modified form of drum and cable mechanism for use in the same combination as illustrated in Fig. 1.
Figure 4:
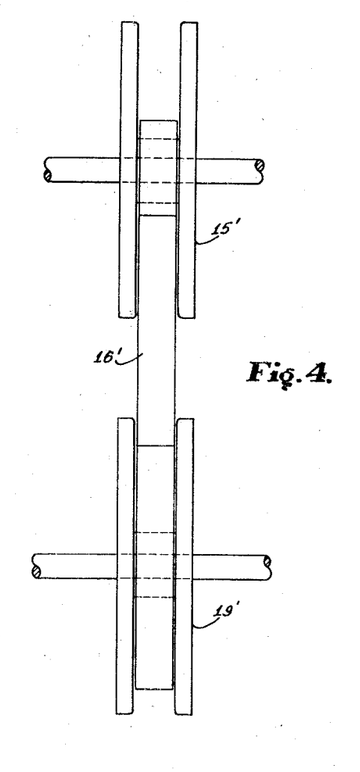

Instead of the form of drums and cable illustrated in Fig. 1, the drums might be of the form indicated at 15' and 19' in Figs. 3 and 4, in which a flat cable or steel belt 16' would be wound from drum 19' onto drum 15', thereby varying the diameters of their coils. In fact, this modified form might be preferred in certain installations where several hundred turns are required for proper acceleration and where the matter of space is a vital consideration. Otherwise, the mechanism would be the same, with the possible exception that disk or cone clutches might be substituted for the dog type of clutch indicated in the present illustration, for the purpose of facilitating synchronization in such modified form of drum.

The drive connection of the sprocket 11, which is loosely mounted upon the shaft 7, is rendered effective by means of an intermediate double clutch mechanism which is splined upon the end portion of shaft 7. This double clutch mechanism comprises the clutch face 27 which is adapted for interconnection with the clutch face 28 provided upon the one side and as part of the sprocket 11. The clutch face 27 is connected with the other part 29 of the double intermediate clutch by means of the bolts 30 which are fixedly mounted upon the marginal portion of the disk 31 of the clutch member 29 and which extend through holes in the marginal portion of the clutch member 27. These parts are normally maintained in effective engagement with each other by means of the spiral springs 32 which surround the bolts 30, the springs 32 bearing against the enlarged head portions of the bolts 30 and the clutch member 27. This double clutch or connecting means is adapted to be manipulated by means of a yoke lever arm 33, the ends of which engage in a suitably formed groove 34 provided in the double clutch mechanism and which is pivotally mounted at the point 35 upon the bracket 36.

The other end of the lever 33 is pivotally connected at the point 37 to the one end of the toggle link 38 which is pivotally connected at its other end 39 with the plunger 40 which in turn has operative abutting engagement with the cam 41 provided upon the lower end of the clutch pedal 2. The clutch pedal 2 has also pivotally connected thereto at the point 42 the plunger rod 43 of the plunger 49 within the vacuum cylinder 50. Briefly, the plunger 49 is adapted to be maintained in withdrawn position (as in Fig. 1) by force of suction from the intake manifold of the engine but is released from such position by actuation of the accelerator. The means for controlling the operation of this part of the mechanism will be explained later.

With the parts just described in the position indicated in full lines, the clutch member 27 will be brought into engagement with the clutch member 28 as part of the operation which is effected by actuation of the accelerator of the engine and through the instrumentality of the closing of the regular clutch as part of the same operation, to be more fully hereinafter explained; that is, upon actuation of the accelerator, the conventional clutch will be automatically released so as to close, and, as part of the same manipulation, the clutch members 27 and 28 will be engaged. These parts are so constructed and designed in their operation that the engagement of the clutch faces 27 and 28 will be effected immediately prior to actual engagement of the conventional clutch which is here indicated in a general way by reference numeral 1.

Thus, with the clutch members 27 and 28 in operative engagement with each other and with the automobile engine in operation and with the conventional transmission set in high gear, power will be transmitted from the shaft 7 through the clutch members 27, 28, sprocket chain 12, sprocket wheel 13, and the drum and cable mechanism 15, 16, 19, so as to wind the cable from the drum 19 on to the smaller drum 15 and thereby gradually and progressively accelerate the rate of speed. This power is further transmitted from the drum 19 through the sprocket 20, sprocket chain 23, and pawl and ratchet mechanism to the clutch member 26 which is fixedly mounted upon the shaft 8. Thus, the power is transmitted from the drive shaft 7 through the intermediate gradually accelerating mechanism to the driven shaft 8. Then assuming that the conventional transmission 9 has been set in high gear, the rate of speed of the driven shaft 8 will be gradually accelerated from zero to approximately that of the drive shaft, at which point there is automatically established direct drive connection and then the speed can be further increased to any point desired and without any shifting of gears. This same mechanism can be operated with the conventional transmission set in any of the several gear ratios.

When the drum and cable mechanism has completed its operation, the direct drive connection between the drive shaft 7 and the driven shaft 8 is established by automatically effecting operative connection between the clutch members 26 and 29 in substitution for the drive connection between the clutch members 27 and 28. In other words, the direct drive connection is substituted in place of the gradually accelerating drive connection. A fuller understanding of this manner of operation will be later obtained.

I have provided also a means for automatically re-winding the cable 16 from the drum 15 on to the drum 19 in case there should be a release of the accelerator pedal 6 during operation of the drum and cable mechanism or when the direct drive connection is established, this arrangement being for the purpose of restoring the drum and cable mechanism to its original or initial condition and thereby render the same ready for repeated operation at any time as may be necessary.

This re-winding mechanism comprises the small electric motor 51 which has the sprocket 52 fixedly mounted upon the shaft of the rotor of the motor and which is adapted to drive the sprocket 53 through the sprocket chain connection 54. The sprocket 53 is fixedly mounted upon the shaft 21 of the drum 19. It is to be understood that the motor 51 is adapted to turn the shaft 21 in a direction opposite to that in which it is turned during the period of speed acceleration.

As soon as the automatic speed accelerating mechanism is set into operation, the switch in the circuit of the motor 51 is automatically closed so that the motor will immediately become effective for the re-wind operation as soon as the accelerator pedal 6 is released during operation of the drum and cable mechanism or when the direct drive connection is established. This closing of the motor circuit is accomplished by means of the worm gear 55 which is mounted upon the shaft 21 and which operates the gear 56 clockwise which in turn carries the cam member 57 for engaging the switch 58 to close the motor circuit 59, as indicated by dotted line position of switch 58. These parts are so constructed and arranged that as soon as the drum 19 begins to rotate, the cam 57 will immediately close the switch 58 so that the motor 51 will then be ready for the re-wind operation. However, during the operation of the drum or cable mechanism during the period of speed acceleration, the rotor of the motor 51 will be pulled backwards by the comparatively greater force of the shaft 21 and consequently the motor 51 will be of no effect so long as the drum and cable mechanism is active.

As soon as the drum and cable mechanism ceases operation at any time, the motor 51 will at once become effective for operation of the shaft 21 in the reverse direction so as to re-wind the cable 16 upon the drum 19.

The cam 57 is also adapted to engage the finger 60 which extends from the rod 61 and which is adapted to force this rod downwardly so as to thereby break the toggle 38 which is thus moved to the dotted line position indicated in Fig. 1. For this purpose, the rod 61 has pivotal connection at 62 with the link 63 which is pivotally connected at 64 with the joint of the toggle 38. At this same point 64, there is also pivotally connected the plunger rod 65 which is pivotally connected at its other end with the plunger 66 in the vacuum cylinder 67. Briefly, plunger 66 is adapted to be set in elevated position, (as in Fig. 1), by force of suction from the intake manifold of the engine. This force of suction is released by actuation of the accelerator, as will be more fully explained.

The breaking of the toggle 38 by means of the cam 57 engaging the projection 60 in the manner just explained, is effected at a point in the operation of the speed-accelerating mechanism when the cable 16 has been practically entirely wound onto the drum 15. In other words, these two drums are so designed that when the cable 16 extends between the large end portion of the drum 15 and the small end portion of the drum 19, the drum 19 will be operating at a speed slightly less than that of the drum 15. In this connection, it will be observed that the small end portion of the drum 19 and also the large end portion of the drum 15 are of substantially cylindrical form. Thus, during this period of speed acceleration, there is a slight differential between the rates of speed of the clutch members 26 and 29 while these clutch members still occupy inoperative position with respect to each other. This is to ensure engagement between the clutch members. Upon breaking the toggle 38 in the manner just explained, the coil spring 68 then immediately forces the clutch member 29 toward the left, as viewed in Fig. 1, so as to engage the clutch member 26 and this will be accomplished in an effective manner by virtue of the slight differential between the speeds of these two members as just referred to.

As the clutch member 29 is first moved into engagement with the clutch member 26, the clutch member 27 will still remain in engagement with the clutch member 28 so long as there is a driving engagement between the clutch members 27 and 28. The simultaneous connection of the clutch members 29 and 27 with their respective companion clutch members is permitted by the compression of the springs 32 as the clutch member 29 is moved away from the clutch member 27. Then when the clutch member 29 has been effectively brought into engagement with the clutch member 26 so as to establish a direct drive connection from the shaft 7 to the clutch member 26 which is fixedly mounted upon the shaft 8, the one-way drive connection between the pawl 25 and the ratchet 24 is discontinued by virtue of the fact that the clutch member 26 is now operating at a rate of speed in advance of that of the ratchet 24. At the same time, the driving engagement between the clutch members 27 and 28 is discontinued so as to permit the clutch member 27 to be removed from engagement with the clutch member 28 by force of the springs 32 and there is thus established direct drive connection between the shaft 7 and the shaft 8.

Then with the driving connection through the clutch members 27 and 28 discontinued, the rotor of the electric motor 51 is permitted to be turned so as to re-wind the cable 16 upon the drum 19. This re-winding operation will continue until the cam 57 has been turned in a counter-clockwise direction so as to open the switch 58, whereupon the operation of the motor 51 is stopped.

Each of the drums 15 and 19 is provided with a brake shoe 69' and a spring 69 arranged in the housing 70 for the purpose of insuring proper stopping of the rotation of these drums and thereby preventing any over-running. In this way the cable is kept in taut condition at all times.

As a means of preventing any sudden jerks being transmitted from the shaft 8 through the transmission 9, I have provided a slip coupling 71 which may be of any suitable form of construction.

When the direct drive connection between the shafts 7 and 8 has been established in the manner above explained, it will not be interrupted by release of the accelerator so long as the rate of speed of operation of the shaft 8 is maintained above a certain predetermined point, there being provided an automatic control mechanism for this purpose. In case, however, the rate of speed of the shaft 8 should for any reason fall below such pre-determined point, then release of the accelerator will cause the direct drive connection between the shafts 7 and 8 to be discontinued; and then upon renewed actuation of the accelerator, the operation of the drum and cable mechanism will be again initiated for again gradually building up the speed of the shaft 8 up to the point desired, in the same manner as above explained.

For this purpose, I have provided the centrifugal control 72 which is operated through the bevel gear connections 73 and 74 from the shaft 8, the gear 74 being fixedly mounted thereupon. The centrifugal control 72 has operative connection with the lever 75 which is pivotally mounted at the point 76 in a suitable bracket and which has operative connection with the vertically disposed plunger rod 77' connected at its other end to the plunger 77—78 arranged within the casing 79. In a general way, the function of the centrifugal control 72 is to operate the piston or plunger valve 78 in accordance with the speed of the shaft 8 so as to prevent the accelerator manipulation from affecting the suction and thereby permit relaxation of the accelerator without interrupting the direct drive connection above a certain speed. The operative connections by which this control is effected will be more fully understood from the following.

In the present system as herein disclosed and as above briefly referred to, I have utilized the suction from the intake manifold of the engine as a means for controlling the positions of the plungers 49 and 66, and in this connection, I have provided plunger valves which are adapted to regulate the communication of the force of suction from the manifold, all under control of the accelerator pedal and the centrifugal control means 72. This control system will now be described.

The pipe 80 provides a connection between the intake manifold 4 and the cylindrical casing 81 within which the piston valves 82 and 83 are adjustable. The valves 82 and 83 are connected together, as indicated by reference numeral 84, and this combination of valves is adapted for adjustment by means of the rod 85 which is connected to the valve 82 and which is also provided with the button 86 for operative engagement with the lever arm 87 of the butterfly valve 5. The rod 85 has pivotal connection at the point 88 with the lever arm 89 which is pivotally mounted at the point 90 and is connected at its other end 91 with the accelerator pedal 6. The spring 92 normally returns the accelerator pedal 6 to inactive position upon release of the same.

As indicated in Fig. 1, the pipe 80 opens into the casing 81 in the middle portion thereof and is adapted to communicate with the space allowed between the piston valves 82 and 83 according to the position indicated in the drawings.

The pipe 93 has communication at its one end with the space in the casing 81 between the valves 82 and 83 and communicates at its other end with the middle part of the casing 79, that is, the pipe 93 opens into the space between the piston valves 77 and 78 according to the position shown in Fig. 1.

The casing 81 is provided with the pipe 94 which opens to the atmosphere while the casing 79 is provided with the pipe 95 which also opens to the atmosphere.

The casing 79 has the pipe 96 opening from the middle part thereof, that is, from the space between the valves 77 and 78, and communicates at its other end with the pipe 97 which extends from the cylinders 67 and 50 these points of communication with these cylinders being at the rear of the plungers 66 and 49.

With the control system in the condition as indicated in Fig. 1 and with the engine in operation but without actuation of the accelerator as yet, the double clutch or connecting means will occupy neutral position as indicated in Fig. 1, and there will be no transmission of power whatever from the shaft 7 to the shaft 8. The conventional clutch is open, as indicated by the depressed position of the clutch pedal 2 which is held in such position by the force of suction from the intake manifold through the pipe 80, casing 81, pipe 93, casing 79, pipe 96, pipe 97, and casing 50. Thus, the force of suction from the intake manifold is effective in maintaining the plunger 49 in the position indicated in Figs. 1 and 2.

Also, with the parts in the condition just referred to, that is, with the engine idling but without actuation of the accelerator, the force of suction will likewise be effective through the pipe 96, pipe 97, and the cylinder 67 so as to maintain the plunger 66 in elevated position, as indicated in Fig. 1. With the plunger 66 in such elevated position, the toggle links 38 are maintained in raised or substantially straightened position with the toggle joint raised slightly above dead center.

With the system in such condition as just referred to, it is to be understood also that the switch 58 is open and that the cam 57 is in position just to the right of the switch 58 and is ready to close the same immediately upon initiation of the operation of the drum and cable mechanism, as before explained.

It is to be understood also that the parts are so constructed and arranged that the spring 68 will not close the clutch 29 into engagement with the clutch 26 so long as the toggle links 38 occupy raised or straightened position, as indicated in Fig. 1. Neither will the clutch member 27 engage the clutch member 28 until the straightened toggle links 38 have been actuated, in the manner above explained, by the release of the holding force of suction upon the rear of the plunger 49.

Then, with the parts in the position just described, and upon depression of the accelerator 6, the butterfly valve 5 will be opened in the usual manner and at the same time the valves 82 and 83 will be moved toward the left, as viewed in Fig. 1, so as to close the opening of the pipe 80 and uncover the opening of the pipe 94. In this way, the communication of suction into the casing or chamber 81 is discontinued and the pipe 93, through the casing 81, is thereby opened to atmosphere through the pipe 94. The effect of this manipulation is to discontinue the force of suction upon the plungers 66 and 49 and thereby permit the clutch to close, the clutch pedal at this time moving toward the left, as viewed in the drawings, so as to engage the rod 40 and thereby move the straightened toggle levers 38 toward the left so as to close the clutch members 27 and 28 for operation of the drum and cable mechanism, as above explained. These clutch members are actually closed prior to engagement of the conventional clutch.

It will be understood also that as soon as the force of suction is relieved from the rear side of the plunger 66, the rod 63 is then free to be moved downwardly for the purpose of breaking the toggle joint 38 as soon as the cam 57 is turned to the proper point for engagement with the projection 60 in the manner above explained. It will be recalled that the purpose of breaking the toggle joint 38 so as to occupy the dotted line position is to permit the force of the spring 68 to be exerted for closing of the clutch members 29 and 26 to thereby establish direct drive connection between the shafts 7 and 8.

During operation of the drum and cable mechanism for gradually building up the speed of the shaft 8, that is, while and so long as the clutch members 27 and 28 are in engagement, the accelerator pedal 6 may, if required or desired, be released at any time and, as before explained, such release of the accelerator will permit re-winding of the cable 16 automatically in the manner already explained. Then, upon again actuating the accelerator, the drum and cable mechanism will be again operated for transmission of power to the shaft 8. Uninterrupted actuation of the accelerator will cause continued operation of the drum and cable mechanism until such operation is completed and the direct drive connection is established in the manner above explained.

Operation of the drum and cable mechanism will continue even upon release of the accelerator 6, provided that the speed of the shaft 8 is above or not below a certain predetermined point, as above stated. This is made possible by the centrifugal control mechanism 72 which, as before explained, has operative connection with the plunger valves 77 and 78 which are connected together so as to be operated as a unit.

Assuming that the speed of the shaft 8 through the direct-drive connection is greater than 15 miles per hour for which the centrifugal control 72 is set, then in case the accelerator pedal 6 should be released and so long as the speed of the shaft 8 continues at a point above 15 miles per hour, the direct drive connection between the shafts 7 and 8 will not be interrupted. This control is made possible by the movement of the valves 77 and 78 upwardly through the operative connections with the centrifugal control 72 so as to close the entrance of pipe 93 into the chamber 79 and at the same time open the chamber 79 to the atmospheric connection through pipe 95. In this way, the force of suction from the intake manifold is no longer communicated through the chamber 79 and the pipes 96 and 97 and this suction has no effect whatever upon the chambers 50 or 67 even though the accelerator has been released. Thus, so long as the speed of shaft 8 continues above the predetermined point for which the centrifugal control 72 is set, the direct drive connection between shafts 7 and 8 will continue regardless of the position of the accelerator pedal 6 and the valves 82 and 83.

If, however, the speed of shaft 8 should be below 15 miles per hour with the direct drive between shafts 7 and 8, then the centrifugal control of the valves 77 and 78 will not be effective but these two valves will be permitted to occupy the position indicated in Fig. 1 so as to afford communication of the force of suction from the intake manifold through the chamber 79 and the pipes 96 and 97 to the cylinders 50 and 67. This means that upon reduction in the speed of the shaft 8 below the predetermined point and upon release of the accelerator pedal 6, the conventional clutch will be automatically released by the force of suction through the connections just referred to and consequently, the direct drive connection will be interrupted by a return of the intermediate double clutch member to neutral position. Then, upon renewed actuation of the accelerator, the drum and cable mechanism may be brought into operation in the same manner as above described. In this connection, it will be understood that while the clutch members 29 and 26 are in engagement, the toggle links 38 are in dotted line position (Fig. 1), and that upon restoration of the force of suction to the cylinder 67 upon lowering of the speed of shaft 8 below the predetermined point, the toggle links 38 will be drawn upwardly into substantially straight or locked position, as indicated in full lines in Fig. 1. Such action will withdraw the clutch member 29 from engagement with the clutch member 26 so as to interrupt the direct drive connection between shafts 7 and 8, and the intermediate double clutch will then occupy neutral position as above referred to.

It is to be understood that the conventional clutch and transmission can be employed at any time desired. For instance, in case of starting on a steep hill, the transmission 9 should be set in low or intermediate gear ratio. In intermediate gear, there will be obtained a very rapid and powerful acceleration by means of the drum and cable mechanism. When the proper rate of speed has been reached in intermediate gear, the gear ratio will be shifted to high, in the usual manner.

If the rate of speed of propulsion of the vehicle, while in high or intermediate gear, should fall to a point where, except for the present invention, the gear ratio would be shifted to intermediate or low gear, as the case might be, the operator may momentarily release the accelerator, thereby interrupting the direct drive connection, and then immediately again depress the accelerator pedal so as to set into operation the drum and cable mechanism for building up the speed to the point desired without having to resort to the lower gear ratio in the conventional transmission.

Also, if during operation of the drum and cable mechanism, a sufficiently high rate of speed has not been obtained preliminary to establishment of direct drive connection between shafts 7 and 8, the operator can momentarily interrupt the direct or active winding of the cable, by releasing the accelerator pedal, thereby permitting the cable to be re-wound upon drum 15; and then upon immediately again depressing the accelerator pedal, the drum and cable mechanism may be given renewed operation at an increased rate of speed so as to obtain the speed desired preparatory to establishment of the direct drive connection. Since the quantity of fuel fed to the engine by actuation of the accelerator will determine the power transmitted to the drum 15 for operation of the drum and cable mechanism, it will be readily understood how the manipulation just mentioned is possible.

To recapitulate, the main operations are as follows: The engine having been started but only idling, the conventional transmission can be set in high gear and then upon actuation of the accelerator the drum and cable mechanism will be operated so as to transmit power to the driven shaft at a gradually increasing rate of speed. Any release of the accelerator during this period will automatically effect re-winding of the cable. Upon completion of the operation of the drum and cable mechanism, the direct drive connection is automatically established and may be continued at increased speed, as desired, by continued actuation of the accelerator. Thus, the rate of speed of the driven shaft can be gradually accelerated from zero to any point desired by first setting the conventional transmission in high gear and without any shifting of gears therein.

So long as the rate of speed of the driven shaft continues above a certain point, the direct drive connection will not be interrupted by release of the accelerator pedal. But, should this speed fall below such point, then the direct drive connection will be automatically interrupted upon release of the accelerator pedal; and then upon again actuating the accelerator, the drum and cable mechanism will be set into operation so as to gradually build up the speed to any point desired.

The advantages resulting from my improved automatic transmission mechanism will be apparent to those who are skilled in the art to which my invention relates.

It is to be understood that the present disclosure is merely for purposes of illustration and that other modifications and variations may be made without departing from the spirit of the present invention as herein set forth and claimed.

What I claim is:

1. In a power-transmission mechanism, the combination of a drive shaft, a driven shaft, motive means for operating said drive shaft, disengageable connecting means between said drive and driven shafts, a gradually progressive power-transmitting means including drum and cable mechanism adapted for operative connection between said drive and driven shafts, means for rendering said progressive power-transmitting means operative, and means whereby operation of said progressive power-transmitting means will effect engagement of said connecting means so as to thereby establish direct drive connection between said drive and driven shafts.

2. In a power-transmission mechanism, the combination of a drive shaft, a driven shaft, motive means for operating said drive shaft, disengageable connecting means between said drive and driven shafts, an accelerator for said motive means, a combined drum and cable means adapted for gradually and progressively transmitting power from said drive shaft to said driven shaft, means whereby actuation of said accelerator will render said drum and cable means operative, and means whereby operation of said drum and cable means will effect engagement of said connecting means so as to thereby establish direct drive connection between said drive and driven shafts.

3. In a power transmission mechanism, the combination of a drive shaft, a driven shaft, an internal combustion engine for operating said drive shaft, disengageable connecting means between said drive and driven shafts, an accelerator for varying the supply of fuel to the engine, a gradually progressive power-transmitting means adapted for operative connection between said drive and driven shafts, means whereby actuation of said accelerator will render said power-transmitting means operative, and means whereby operation of said power-transmitting means will effect engagement of said connecting means so as to thereby establish direct drive connection between said drive and driven shafts.

4. In a power transmission mechanism, the combination of a drive shaft, a driven shaft, an internal combustion engine for operating said drive shaft, a conventional transmission affording the usual speed ratios for forward and reverse propulsion, a gradually progressive power-transmitting means adapted for operative connection between said drive and driven shafts, an accelerator for said engine, means whereby actuation of said accelerator will render said power-transmitting means operative for any given speed ratio of the conventional transmission, and means whereby operation of said power-transmitting means will effect engagement of said connecting means so as to thereby establish direct drive connection between said drive and driven shafts.

5. In a power transmission mechanism, the combination of a drive shaft, a driven shaft, an internal combustion engine for operating said drive shaft, disengageable connecting means between said drive and driven shafts, an accelerator for said engine, a clutch in said drive shaft between said engine and connecting means, a conventional transmission affording the usual speed ratios for forward and reverse propulsion, a gradually progressive power-transmitting means adapted for operative connection between said drive and driven shafts, means whereby actuation of said accelerator will render said power-transmitting means and said clutch operative for any given speed ratio of the conventional transmission, and means whereby operation of said progressive power-transmitting means will effect engagement of said connecting means so as to thereby establish direct drive connection between said drive and driven shafts.

6. In a power transmission mechanism, the combination of a drive shaft, a driven shaft, an internal combustion engine for operating said drive shaft, an accelerator for said engine, a conventional transmission affording the usual speed ratios between the drive and driven shafts for forward and reverse propulsion, a clutch between said engine and transmission, means for manipulating said transmission and clutch in the conventional manner, a gradually progressive power-transmitting means adapted for operative connection temporarily in said drive shaft, and means whereby said gradually progressive power-transmitting means may be rendered effective.

7. In a power transmission mechanism, the combination of a drive shaft, a driven shaft, an internal combustion engine for operating said drive shaft, an accelerator for said engine, a conventional transmission affording the usual speed ratios between the drive and driven shafts for forward and reverse propulsion, a clutch between said engine and transmission, means for manipulating said transmission and clutch in the conventional manner, a gradually progressive power-transmitting means adapted for operative connection temporarily in said drive shaft, and means adapted for actuation in conjunction with said accelerator whereby said gradually progressive power-transmitting means may be rendered effective.

8. In a power transmission mechanism, the combination of a drive shaft, a driven shaft, an internal combustion engine for operating said drive shaft, an accelerator for said engine, a conventional transmission affording the usual speed ratios between the drive and driven shafts for forward and reverse propulsion, a clutch between said engine and transmission, means for manipulating said transmission and clutch in the conventional manner, a gradually progressive power-transmitting means adapted for operative connection temporarily in said drive shaft, and means whereby actuation of said accelerator will render said progressive power-transmitting means effective.

9. In a power-transmission mechanism, the combination of a drive shaft, a driven shaft, motive means for operating said drive shaft, an accelerator for said motive means, a disengageable dual connecting means arranged between said drive and driven shafts, one part of said connecting means comprising a gradually progressive power-transmitting means, and the other part of said connecting means comprising a clutch for direct drive connection between said drive and driven shafts, and means whereby actuation of said accelerator will render said progressive power-transmitting means operative and continued operation of said progressive power-transmitting means will automatically effect engagement of said clutch for direct drive connection between said drive and driven shafts.

10. In a device of the class described, a driven shaft, a gradually progressive power-transmitting mechanism for driving said driven shaft, said mechanism including a combined drum and cable means, means for operating said drum and cable means in one direction for effective operation of said driven shaft, and means for automatically operating said drum and cable means idly in the reverse direction upon release of said first operating means so as to re-wind said drum and cable means.

11. In a device of the class described, a driven shaft, a power means, a gradually progressive power-transmitting mechanism including a combined drum and cable means, means for connecting said power means through said power-transmitting mechanism to said driven shaft so as to gradually accelerate the speed of said driven shaft, means for automatically connecting said power means direct to said driven shaft upon completion of operation of said power-transmitting mechanism and at the same time disconnecting said power-transmitting mechanism, and means for automatically operating said drum and cable means idly in the reverse direction upon release of said power means therefrom so as to re-wind said drum and cable means.

12. In a device of the class described, a driven shaft, a power means, an accelerator for said power means, a gradually progressive power-transmitting mechanism including a combined drum and cable means and having a conical element as part thereof, means controlled by manipulation of said accelerator for connecting said power means through said power-transmitting mechanism to said driven shaft so as to gradually accelerate the speed of said driven shaft, means for automatically connecting said power means direct to said driven shaft upon completion of operation of said power-transmitting mechanism and at the same time disconnecting said power-transmitting mechanism, and means for automatically operating said drum and cable means idly in the reverse direction upon release of said accelerator so as to rewind said drum and cable means.

13. In a power-transmission mechanism, the combination of a drive shaft, a driven shaft, motive means for operating said drive shaft, an accelerator for said motive means, a conventional clutch in said drive shaft, a disengageable dual connecting means arranged between said drive and driven shafts, one part of said connecting means comprising a gradually progressive power-transmitting means, and the other part of said connecting means comprising an additional clutch for direct drive connection between said drive and driven shafts, an operative connection between said conventional clutch and said connecting means whereby closing movement of said conventional clutch will also render said power-transmitting means operative, means for holding said operative connection in position for such operation, means whereby actuation of said accelerator will close said clutch and also release said holding means, means whereby operation of said power-transmitting means will remove said operative connection from said position, and means for effecting engagement of said additional clutch upon removal of said operative connection from such position, thereby establishing direct drive connection between said drive and driven shafts.

14. In a device of the class described, a driven shaft, a gradually progressive power-transmitting mechanism for driving said driven shaft, said mechanism including a combined drum and cable means, an internal combustion engine for operating said drum and cable means in one direction for effective operation of said driven shaft, an accelerator for said engine, and means for automatically operating said drum and cable means idly in the reverse direction upon release of said accelerator, so as to thereby re-wind said drum and cable means.

15. In a power-transmission mechanism, the combination of a drive shaft, a driven shaft, motive means for operating said drive shaft, an accelerator for said motive means, a conventional clutch in said drive shaft, a disengageable dual connecting means arranged between said drive and driven shafts, one part of said connecting means comprising a gradually progressive power-transmitting means, said power-transmitting means including a combined drum and cable means, and the other part of said connecting means comprising an additional clutch for direct drive connection between said drive and driven shafts, an operative connection between said conventional clutch and said connecting means whereby closing movement of said conventional clutch will also render said power-transmitting means operative, means for holding said operative connection in position for such operation, means whereby actuation and release of said accelerator will close and open said clutch, respectively, and will also release and restore said holding means, respectively, means whereby operation of said power-transmitting means will remove said operative connection from said position, means for effecting engagement of said additional clutch upon removal of said operative connection from said position, thereby establishing direct drive connection between said drive and driven shafts, and means for automatically operating said drum and cable means idly in the reverse direction upon release of said accelerator so as to re-wind said drum and cable means and also restore said operative connection to its former said position.

16. In a power-transmission mechanism, the combination of a drive shaft, a driven shaft, motive means for operating said drive shaft, an accelerator for said motive means, a conventional clutch in said drive shaft, a disengageable dual connecting means arranged between said drive and driven shafts, one part of said connecting means comprising a gradually progressive power-transmitting means, said power-transmitting means including a combined drum and cable means, and the other part of said connecting means comprising an additional clutch for direct drive connection between said drive and driven shafts, an operative connection between said conventional clutch and said connecting means whereby closing movement of said conventional clutch will also render said power-transmitting means operative, means for holding said operative connection in position for such operation, means whereby release and actuation of said accelerator, only when said driven shaft is being operated below a predetermined rate of speed will open and close said conventional clutch, respectively, and also restore and release said holding means, respectively, means whereby operation of said power-transmitting means will remove said operative connection from said position, means for effecting engagement of said additional clutch upon removal of said operative connection from said position, thereby establishing direct drive connection between said drive and driven shafts, and means for automatically operating said drum and cable means idly in the reverse direction upon release of said accelerator so as to thereby re-wind said drum and cable means and also restore said operative connection to its former said position.

17. In a power-transmission mechanism, the combination of a drive shaft, a driven shaft, motive means for operating said drive shaft, an accelerator for said motive means, a conventional clutch in said driven shaft, a disengageable dual connecting means arranged between said drive and driven shafts, one part of said connecting means comprising a gradually progressive power-transmitting means, said power-transmitting means including a combined drum and cable means, and the other part of said connecting means comprising an additional clutch for direct drive connection between said drive and driven shafts, an operative connection between said conventional clutch and said connecting means whereby closing movement of said conventional clutch will also render said power-transmitting means operative, means for holding said operative connection in position for such operation, means whereby release and actuation of said accelerator will open and close said clutch, respectively, and also restore and release said holding means, respectively, a motor for operating said drum and cable means idly in the reverse direction so as to re-wind the same, means operable by said power-transmitting means for establishing operative connections for said motor and for removing said operative connection from said position, said last-named means being operatable in the reverse direction by said motor so as to restore said operative connection to its said position and to discontinue operative connections in said motor, and means for effecting engagement of said additional clutch upon removal of said operative connection from said position, thereby establishing direct drive connection between said drive and driven shafts.

18. In a power-transmission mechanism, the combination of a drive shaft, a driven shaft, motive means for operating said drive shaft, disengageable connecting means between said drive and driven shafts, an accelerator for said motive means, a gradually progressive power-transmitting means adapted for operative connection between said drive and driven shafts, means whereby actuation of said accelerator will render said progressive power-transmitting means operative, and means whereby operation of said progressive power-transmitting means will effect engagement of said connecting means so as to thereby establish direct drive connection between said drive and driven shafts, and means, operatable only when said driven shaft is operated below a predetermined rate of speed, whereby said direct drive connection will be automatically interrupted so that operation of said power-transmitting means may then be resumed upon actuation of said accelerator.

19. In a power-transmission mechanism, the combination of a drive shaft, a driven shaft, motive means for operating said drive shaft, disengageable connecting means between said drive and driven shafts, an accelerator for said motive means, a gradually progressive power-transmitting means adapted for operative connection between said drive and driven shafts, means whereby actuation of said accelerator will render said progressive power-transmitting means operative, means whereby operation of said progressive power-transmitting means will effect engagement of said connecting means so as to thereby establish direct drive connection between said drive and driven shafts, and means whereby, above a predetermined rate of speed of said driven shaft, said accelerator may be released without disturbing the direct drive connection between the drive and driven shafts.

20. In a power transmission mechanism, the combination of a drive shaft, a driven shaft, motive means for operating said drive shaft, disengageable connecting means between said drive and driven shafts, a gradually progressive power-transmitting means adapted for operative connection between said drive and driven shafts, said power-transmitting means including a pair of reels and a flat cable adapted to be unwound from the one and wound upon the other reel in coils of decreasing and increasing diameters respectively, means for rendering said progressive power-transmitting means operative, and means whereby operation of said progressive power-transmitting means will effect engagement of said connecting means so as to thereby establish direct drive connection between said drive and driven shafts.

21. In a power-transmission mechanism, the combination of a drive shaft, a driven shaft, motive means for operating said drive shaft, disengageable connecting means between said drive and driven shafts, a gradually progressive positive power-transmitting means including reel and flat tape mechanism adapted for operative connection between said drive and driven shafts, means for rendering said progressive power-transmitting means operative, and means whereby operation of said progressive power-transmitting means will effect engagement of said connecting means so as to thereby establish direct drive connection between said drive and driven shafts.

22. In a power transmission mechanism, the combination of a drive shaft, a driven shaft, motive means for operating said drive shaft, disengageable connecting means between said drive and driven shafts, a gradually progressive power-transmitting means adapted for operative connection between said drive and driven shafts, said power-transmitting means including a plurality of reels and flat tape means adapted to be unwound from one and wound upon another reel in coils of decreasing and increasing diameters respectively, means for rendering said progressive power-transmitting means operative, and means whereby operation of said progressive power-transmitting means will effect engagement of said connecting means so as to thereby establish direct drive connection between said drive and driven shafts.

23. In a power-transmission mechanism, the combination of a drive shaft, a driven shaft, motive means for operating said drive shaft, disengageable connecting means between said drive and driven shafts, a gradually progressive power-transmitting means adapted for operative connection between said drive and driven shafts, means for rendering said progressive power-transmitting means operative, and automatically actuated means whereby operation of said progressive power-transmitting means will automatically effect engagement of said connecting means so as to thereby establish direct drive connection between said drive and driven shafts.

JOHN F. WERDER.